Sept. 11, 1934.        V. TANASSO ET AL        1,973,126
FOLDING OXFORD EYEGLASSES
Filed Oct. 31, 1932
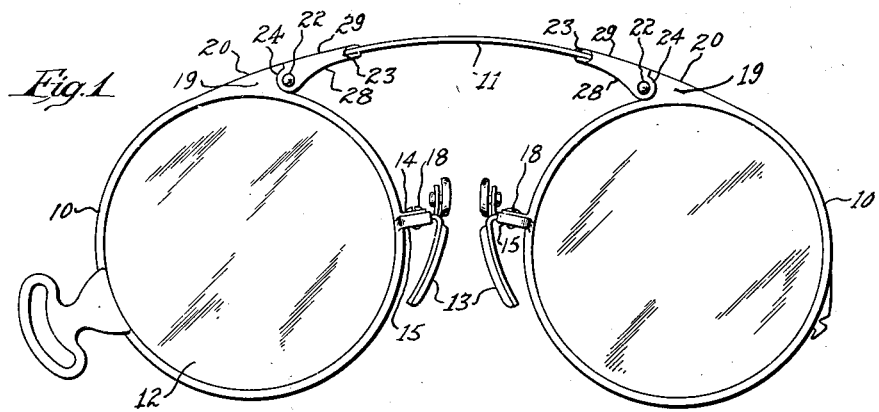
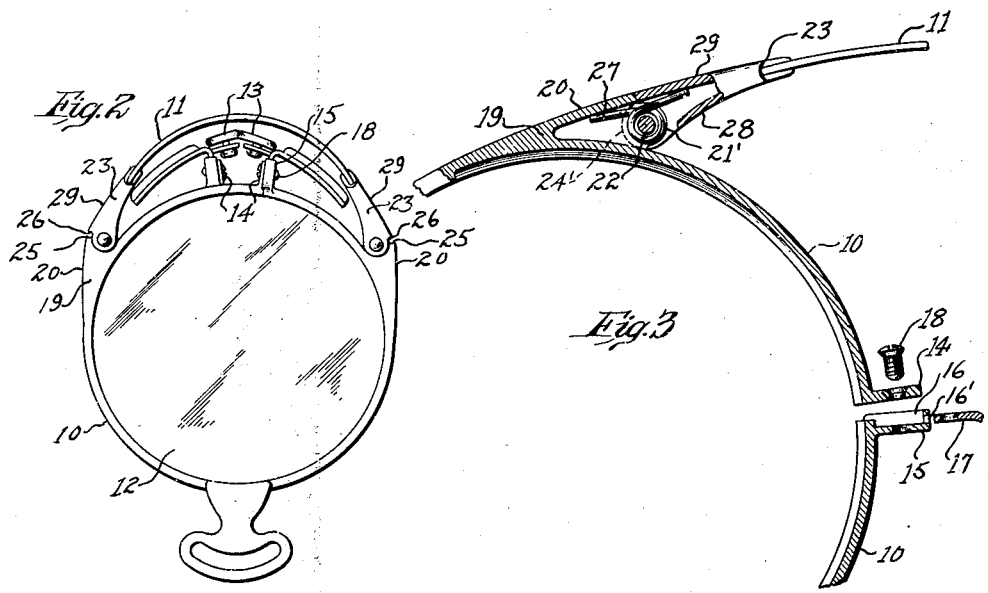
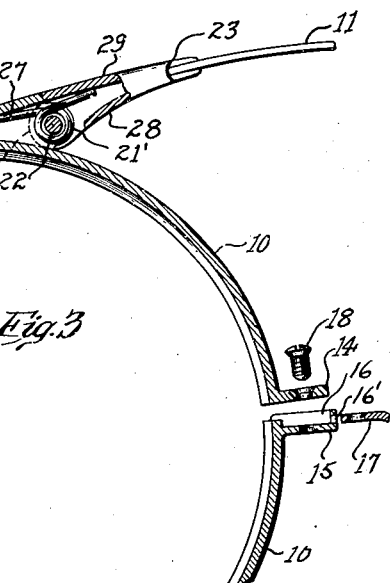
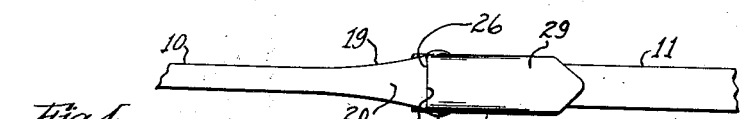
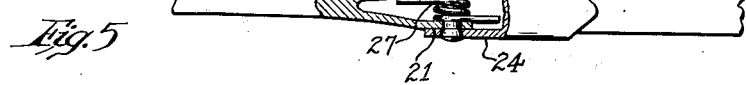
INVENTORS
Vincent Tanasso & Jacob J. Pomeranz,
BY
George D. Richards
ATTORNEY Patented Sept. 11, 1934

1,973,126

UNITED STATES PATENT OFFICE 1,973,126

FOLDING OXFORD EYEGLASSES

Vincent Tanasso, Harrison, and Jacob J. Pomeranz, Brooklyn, N. Y.

Application October 31, 1932, Serial No. 640,400

5 Claims. (Cl. 88—44)

This invention relates, generally, to eye-glass frames having metallic discontinuous rims; and the invention has reference, more particularly, to a novel stream-line form of spring hinge connection for connecting the spring bridge to discontinuous metallic rims in Oxford, lorgnette and similar types of folding eye-glass frames.

Eye-glasses of the folding type, such as Oxford and lorgnette eye-glasses, having discontinuous metallic lens rims, as heretofore generally constructed, have spring hinge joints commonly being positioned adjacent to or combined with the separable ends of the discontinuous lens rims. The presence of the separable rim end connecting means of such eye-glasses at or closely adjacent the spring hinge joints adds to the bulkiness of the frames in the conspicuous region at the top of each lens rim where the bridge is connected to the rim, thereby greatly detracting from the appearance of the eye-glasses.

The principal object of the present invention is to provide a novel folding Oxford eye-glass frame construction of the kind above mentioned, wherein the ends of the spring bridge are connected to uninterrupted portions of the discontinuous lens rims by highly attractive spring hinge joints of stream-line form, the said streamline hinge joints when applied to discontinuous lens rims being positioned on the latter at points spaced away from the separable ends of the same, and preferably at points where nose-guard members are connected thereto.

Another object of the present invention lies in the provision of a novel spring hinge joint for connecting the spring bridge to discontinuous metallic lens rims of folding types of Oxford eyeglass frames, which hinge joint gives the bridge the appearance of merging directly into the lens rims, i. e. the upper surface of the spring bridge merges into and extends within the hinge joint, which is, in turn, similarly curved and merges into the lens rims, giving the spring bridge, the spring hinge joints and the lens rims a trim and neat unitary appearance, the said hinge joints being of extremely simple construction and having cooperating hinge knuckles provided with transverse shoulders serving as metal to metal stop means for determining the normal outswung position of the rims and contained lens relative to the bridge of the eye-glass frame, thereby positively determining and maintaining the desired pupilary distance of the lens.

Other objects of this invention, not at this time more particularly enumerated will be clearly understood from the following detailed description of the same.

The invention is clearly illustrated in the accompanying drawing, in which:

Fig. 1 is an outer face view of a metallic eyeglass frame of the folding Oxford type embodying the principles of the present invention.

Fig. 2 is a view of the frame, shown in Fig. 1, in folded condition.

Fig. 3 is an enlarged fragmentary sectional view showing a portion of the eye-glass frame of Fig. 1.

Fig. 4 is a plan view of the structure shown in Fig. 3; and

Fig. 5 is a view similar to Fig. 4, but with parts broken away to show the interior of the hinged joint.

Similar characters of reference are employed in all of the above described views to indicate corresponding parts.

Referring now to said drawing, the reference numeral 10 designates the lens rims of an all metal folding Oxford eye-glass frame, in which said rims are spaced apart and connected together by a spring bridge 11. The rims 10 are illustrated as discontinuous, i. e. each of these rims is formed with separable meeting ends, provided with coupling means for securing said ends together when the rim has been assembled around and in holding relation to the periphery of a lens 12.

In carrying out the principle of the present invention, the connecting or coupling means for securing the ends of the lens rims together, are spaced from the spring hinge joints connecting the lens rims to the spring bridge. In the form of the invention shown in the drawing, the separable coupled ends of the lens rims are illustrated as located at the points of attachment of the nose-guard 13 to the lens rims, which points of attachment are considerably removed from the bridge hinge joints. As especially shown in Fig. 3 of the drawing, the lens rim coupling is illustrated as consisting of lugs or ears 14 and 15 which project radially outward from the perimeter of the lens rims at the meeting ends thereof.

The lug 15 is illustrated as provided with a recess or socket 16 for receiving the tongue 17 of the nose-guard 13 and for also receiving the cooperating lug 14, the said members being retained in assembled condition as by a screw 18 extending through aligned apertures in lug 14 and in tongue 17 and threaded into the lug 15. The lug 15 is illustrated as provided with an aperture 16' in the side wall thereof communicating with the recess 16, and the nose-guard tongue 17 is inserted through this aperture in entering the recess 16. The above described specific lens rim coupling structure is merely illustrative of one of many different forms of the same which may be utilized in the combination and arrangement of features embodying the present invention, and consequently, as to its detail form, is subject more or less to variation.

The ends of the spring bridge 11 are connected to the rims 10 by spring biased hinged joints embodying the principles of the present invention. Each of these hinge joints consists of a stationary hinge butt 19 fixedly attached to an uninterrupted portion of the rim 10 at the upper part of this rim. The outer wall 20 of the hinge butt 19 is illustrated as having substantially the same contour and is inclined in the same general direction as the adjacent end portion of the spring bridge 11, and this outer wall is also substantially tangent to and merges neatly into the peripheral surface of rim 10, thereby presenting an extremely attractive stream-line appearance, thus avoiding disfiguring projections or protuberances of the rim periphery, as has heretofore existed in metallic folding Oxford eye-glasses. The side walls of hinge butt 19 are formed with perforate ears 21 and 21' for turnably receiving a pivotal pin 22.

Cooperating with the hinge butt 19 is a chambered hinge yoke or knuckle 23 having perforate ears 24 and 24'. Ears 24 and 24' are positioned adjacent and exteriorly of ears 21 and 21' of the hinge butt so as to be engaged by the pivotal pin 22 when the latter is inserted through the thus assembled parts. The perforations of ears 24 and 24' are illustrated as beveled to accommodate the tapered heads of the pivotal pin 22, which tapered heads preferably have a snug or tight fit in the apertures of ears 24 and 24'. The inner and outer walls 28 and 29 of hinge yoke 23 converge from the perforate ears 24 and 24' toward the spring bridge so as to become substantially tangent with the end portion of this bridge 11 at the point where this end portion enters the chambered hinge yoke 23. The bridge end portion projects into and is secured within the hollow box-like interior of the hinge yoke.

The outer wall 20 of hinge butt or knuckle 19 terminates over pivotal pin 22 to provide a transverse shoulder 25 which is normally engaged by a cooperating transverse shoulder 26 provided by the end of the outer wall 29 and hinge yoke 23. The cooperating shoulders 25 and 26 serve as stop means for determining the normal outswung position of the rims 10 relative to the bridge 11, i. e. when the foldable Oxford eye-glass frame is arranged in open or unfolded condition ready for application to the wearer's nose and eyes, said rims being easily retained in such outswung position by a coil torsion spring contained within the hinge butt 19 and hinge yoke 23 in surrounding relation to the pivotal pin 22, the ends of this spring serving to respectively engage the outer walls of the hinge butt and hinge yoke in pressing relation, as especially shown in Fig. 3. Since the stop shoulders 25 and 26 are both formed of metal, they provide a metal to metal engagement which is resistant to wear and distortion, and consequently the pupilary distance of the lenses, determined by their meeting engagement, is maintained against undesired change.

In use, the coil spring 27 cooperates with the spring bridge 11 to hold the lens rims and lenses in their normal useful positions. When it is desired to collapse the eye-glasses, as when through using the same, the lens rims are folded inwardly toward one another in the usual manner until they assume the superimposed positions shown in Fig. 2. During this folding movement, hinge butts 19 turn on their pivotal connections with the hinge yokes, so as to yield or open relative to the latter, in which position said stop shoulders 25 and 26 are separated.

It will be noted from an inspection of Fig. 1 that, as positioned when the eye-glasses are unfolded for use, the spring bridge 11 appears to be a continuation of the lens rims 10, uninterrupted by disfiguring peripheral projections, thereby presenting a smooth continuous stream-line marginal contour across the entire top limits of the eye-glass frame which is of exceedingly neat and attractive appearance.

What is claimed is:

1. In folding Oxford eye-glasses, in combination, discontinuous metallic lens rims, the interrupted portions of said rims being disposed at the sides thereof, means to close and secure said interrupted portions of said rims, a spring bridge intermediate said rims, and yieldable spring hinge joints between said bridge and rims and connected with the latter at points spaced upwardly away from the interrupted portions of said rims, each joint comprising a stationary hinge butt, a hinge yoke pivotally connected with said butt, said butt and yoke having cooperating stop shoulders, spring means for yieldably retaining said butt and yoke in extended normal positions as determined by mutual engagement of their stop shoulders, the butt and yoke of each joint having smoothly continuous streamline exterior margins extending between said rims and bridge and tangent thereto.

2. In folding Oxford eye-glasses, the combination with discontinuous metallic lens rims, the interrupted portions of said rims being disposed at the inner sides thereof in mutually opposed relation, nose guard members, means to both secure the interrupted portions of said rims in closed condition and said nose guard members to said rims, a spring bridge intermediate said rims, and yieldable spring hinge joints between said bridge and rims and connected with the latter at points spaced upwardly away from the interrupted portions of said rims, said joints having smoothly continuous stream-line exterior margins tangent to said rim peripheries.

3. In folding Oxford eye-glasses, the combination with discontinuous metallic lens rims, the interrupted portions of said rims being disposed at the inner sides thereof in mutually opposed relation, nose guard members, means to both secure the interrupted portions of said rims in closed condition and said nose guard members to said rims, a spring bridge intermediate said rims, and yieldable spring hinge joints between said bridge and rims and connected with the latter at points spaced upwardly away from the interrupted portions of said rims, each joint comprising a stationary hinge butt, a hinge yoke pivotally connected with said butt, said butt and yoke having cooperating stop shoulders, spring means for yieldably retaining said butt and yoke in extended normal positions as determined by mutual engagement of their stop shoulders, the butt and yoke of each joint having smoothly continuous stream-line exterior margins extending between said rims and bridge and tangent thereto.

4. In folding Oxford eye-glasses, in combination, discontinuous metallic lens rims, the interrupted portions of said rims being disposed at the sides thereof, means to close and secure said interrupted portions of said rims, a spring bridge intermediate said rims, hinge joints between said bridge and rims and connected with the latter at points spaced upwardly away from the interrupted portions of said rims, each joint comprising a stationary hinge butt, a hinge yoke pivotally connected with said butt, said butt and yoke having cooperating stop shoulders, and the butt and yoke of each joint having smoothly continuous streamline exterior margins extending between said rims and bridge and tangent thereto.

5. In folding Oxford eye-glasses, in combination, discontinuous metallic lens rims, the interrupted portions of said rims being disposed at the sides thereof, means to close and secure said interrupted portions of said rims, nose guards secured in position by said rim closing means, a spring bridge intermediate said rims, hinge joints between said bridge and rims and connected with the latter at points spaced upwardly away from the interrupted portions of said rims, each joint comprising a stationary hinge butt, and a hinge yoke pivotally connected with said butt.

VINCENT TANASSO.
JACOB J. POMERANZ.